United States Patent [19]

Haun

[11] 3,976,858
[45] Aug. 24, 1976

[54] CARD READER ASSEMBLY WITH MANUAL TRANSDUCER

[75] Inventor: Marion W. Haun, Torrance, Calif.

[73] Assignee: American Magnetics Corporation, Torrance, Calif.

[22] Filed: May 16, 1975

[21] Appl. No.: 578,225

[52] U.S. Cl. .............................. 235/61.11 D; 360/107
[51] Int. Cl.² ........................ G11B 5/52; H04Q 3/02
[58] Field of Search ........................... 360/107, 101; 235/61.11 R, 61.11 D, 61.12 M

[56] References Cited
UNITED STATES PATENTS

| | | | |
|---|---|---|---|
| 3,665,163 | 5/1972 | Mast et al. | 235/61.11 D |
| 3,753,255 | 8/1973 | Di Veto | 360/101 |
| 3,822,376 | 7/1974 | Kok et al. | 235/61.11 R |
| 3,866,827 | 2/1975 | Obata et al. | 235/61.11 D |

Primary Examiner—Vincent P. Canney
Attorney, Agent, or Firm—Jessup & Beecher

[57] ABSTRACT

An apparatus constructed to receive a card such as a credit card having one or more magnetic strips containing coded data. The card is inserted in the machine and a manually operated latch mechanism carries a read head along a rail to an abutment. A latching element is automatically released and a motive system carries the read head at constant speed across the face of the card. The readout head transmits the information to a connector which may be connected to any suitable data processing system. When the card is inserted in the apparatus it energizes a contact switch which provides an activating signal to the processing system, through the connector. The readout head is mounted in a gimbaled frame attached to a carrier so that it can ride with constant pressure against the magnetic strip on the card, while at the same time adjusting itself to undulations or other slight deformations in the card or the magnetic strip. The apparatus is constructed without any magnetic materials within magnetic range of the readout head to prevent the danger of spurious signals being injected into the decoding circuit.

8 Claims, 10 Drawing Figures

CARD READER ASSEMBLY WITH MANUAL TRANSDUCER

BACKGROUND OF THE INVENTION

This invention relates generally to data reading and transferring systems, and more particularly relates to systems for reading data recorded on magnetic strips attached to cards.

With the increased use of credit cards, it was imperative that systems be developed to quickly obtain information as to the credit status of a purchaser. This resulted in the development of credit cards on which magnetic strips are applied for storing data which can be quickly read and instantly changed, if desired. Since the use of these types of credit cards is increasing, it is essential that apparatus for accurately reading the data recorded on the cards be provided. It is also essential that the apparatus for reading the credit cards be able to compensate for distortions, because these cards in use frequently become warped, bent, or otherwise slightly damaged through frequent use.

The present invention provides a solution to these problems in that it not only accurately reads the recorded data, but also can compensate for small undulations and distortions in the surface of the card. This apparatus provides a read head on a carrier movable on an elongate rail. The carrier is moved from one end of the rail to the opposite end and then automatically released to permit the read head to travel at constant speed across the face of the credit card. The carrier's travel is initiated by a manually movable latch mechanism which automatically releases the carrier when it reaches the end of the rail. An additional important feature of the invention is that the read head is gimbal mounted in a frame attached to the carrier which permits the head to be displaced to compensate for variations in the surface of the card.

An important advantage of this apparatus is that the read head is carried at constant speed across the card while the card remains stationary. This avoids the difficulty of a movable card being passed across a stationary read head because there is no danger of a damaged card being jammed in the machine.

It is an object of this invention to provide an apparatus for reading data recorded on a card.

Another object of this invention is to provide an apparatus which reads data on a card which is held in a stationary position.

Yet another object of the present invention is to provide an apparatus which can read data on a card while compensating for small undulations and distortions.

Other objects and novel features of the invention will become apparent from the following detailed description of the invention when considered in conjunction with the accompanying drawings wherein like reference numbers identify like parts throughout.

DESCRIPTION OF THE PREFERRED EMBODIMENT

Figure 1:
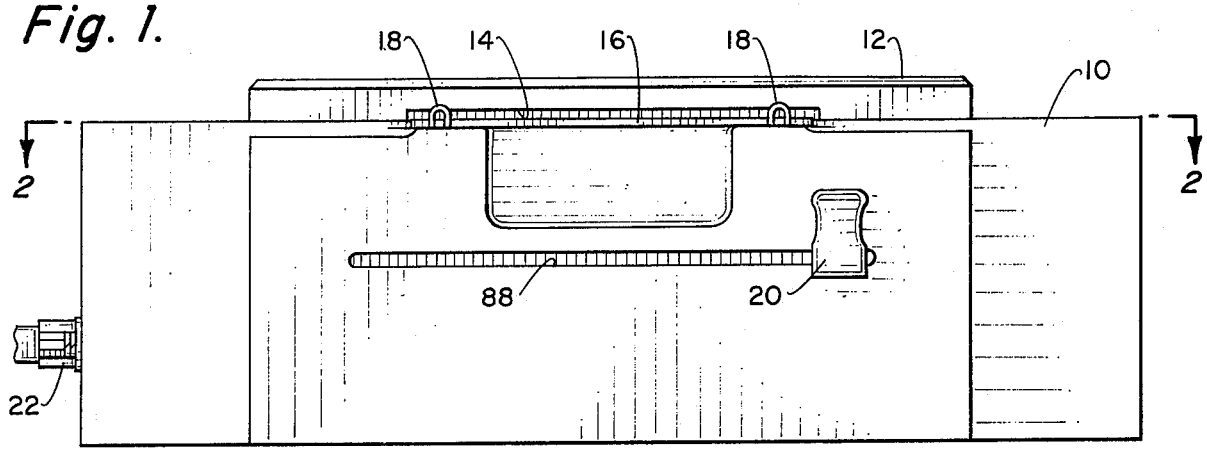
FIG. 1 is a front elevation of the card reader assembly.
Figure 2:
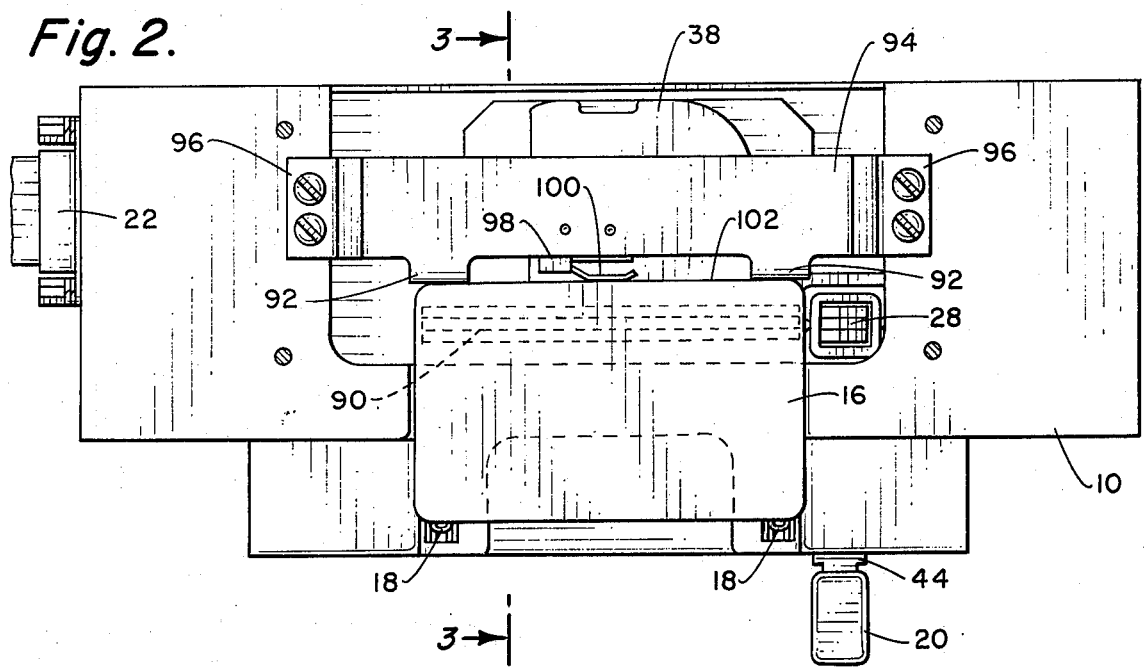
FIG. 2 is a view of the card reader assembly as viewed from line 2—2 of FIG. 1.

The card reader of FIG. 1 is comprised of a housing or frame 10 having a counter 12 attached, which together provide a slot 14 for insertion of a card 16, which is retained by resilient tabs 18. The card reader is operated by means of sliding handle 20 along slot 88 to move the read head past the card 16, which will be discussed in greater detail hereinafter. Connector 22 provides an output from the card reader to any suitable data processing system.

The handle 20 is attached to a lever 44 extending from latch mechanism or ratchet tripping assembly 24, which operates a carrier 26 on which is mounted a read head 28. The carrier 26 is supported by a pair of elongate quide rails 30 and 32. The motive power for the carrier is supplied by a spiral, constant force, drive or return spring 34 which has its free end 36 securely attached to the carrier 26. The speed of the carrier 26, and thus the read head 28, is kept constant during readout by a speed governor 38 engaging rack 40 to provide smooth retraction by the return spring 34. The speed governor is a standard gear-operated centrifugal brake mechanism. The gear 42 of the speed governor 38 engages an elongate rack 40 securely attached to the carrier 26, thus controlling the speed at which the magnetic head assembly 28 travels past the card 16.

Figure 6:
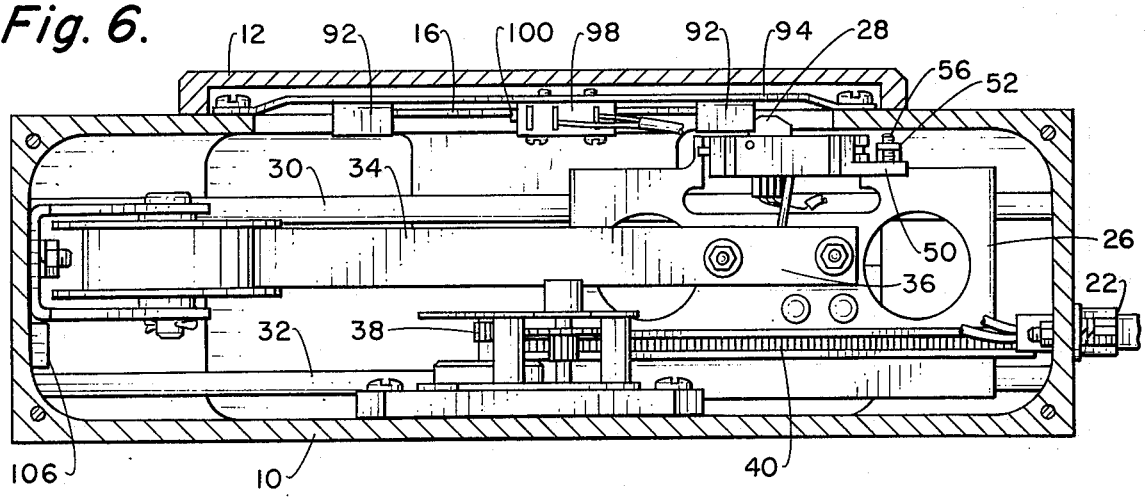
FIG. 6 is a sectional view of the card reader assembly taken along line 6—6 of FIG. 5.

The magnetic heads 28 are gimbal mounted in a frame 46 pivotally mounted on a rod 48 attached to the carrier 26. The gimbal frame 46 has an upward extending tongue 50, which is biased against an adjustable stop 52 by a helical torsion spring 54. The adjustable stop 52 on the carrier 26 maintains the gimbal frame 46 and thus the magnetic heads 28 substantially perpendicular to the frame of the carrier 26. A set screw 56 (FIG. 6) threaded in the stop 52 allows slight adjustment of the plane of the magnetic heads 28.

Figure 3:
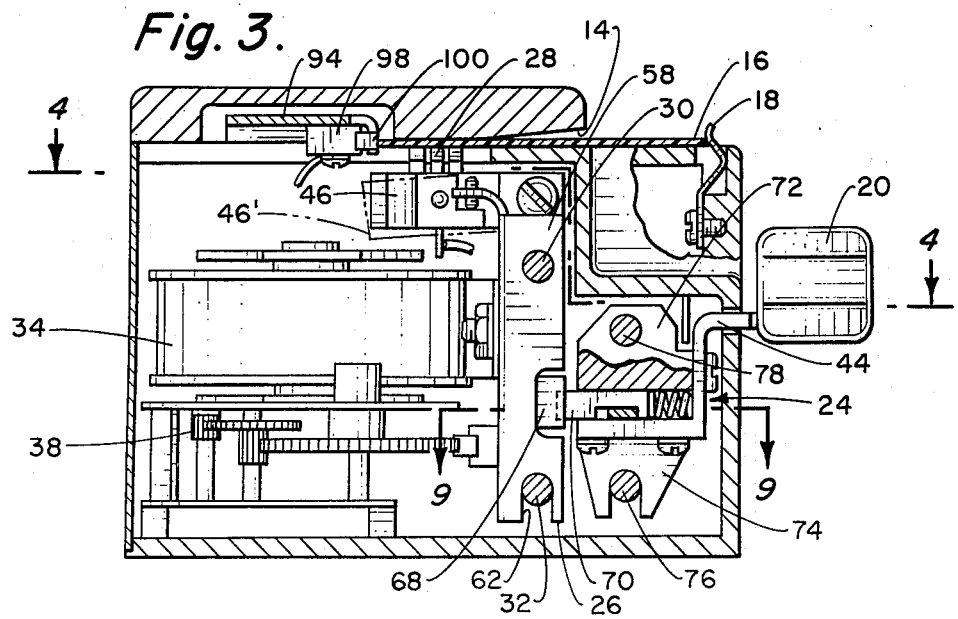
FIG. 3 is a sectional view of the card reader assembly taken at line 3—3 of FIG. 2.

The spring 54 biasing the gimbal frame against the small set screw 56 is primarily an adjustment spring whose principal function is to hold the frame against the end of set screw 56 and thus contribute to the adjustable vertical setting of the gimbal frame 46. The gimbal frame 46 does not pivot appreciably when the reader is used in normal operation. The pivoting is illustrated in FIG. 3 by phantom line 46'. Compliance of the magnetic heads 28 with the surface of a magnetic stripe is provided by the gimbal mounting and by mounting the magnetic heads 28 themselves on leaf springs which permit them to flex back and forth with variations in the magnetic stripe. The torsion spring 54, however, does have the value of being a safety feature in that the gimbal frame may swing away if any obstruction is encountered which would harm the individual leaf springs supporting the individual heads or otherwise jam the machine, since it is only spring biased upwardly and not rigidly fixed.

Figure 8:
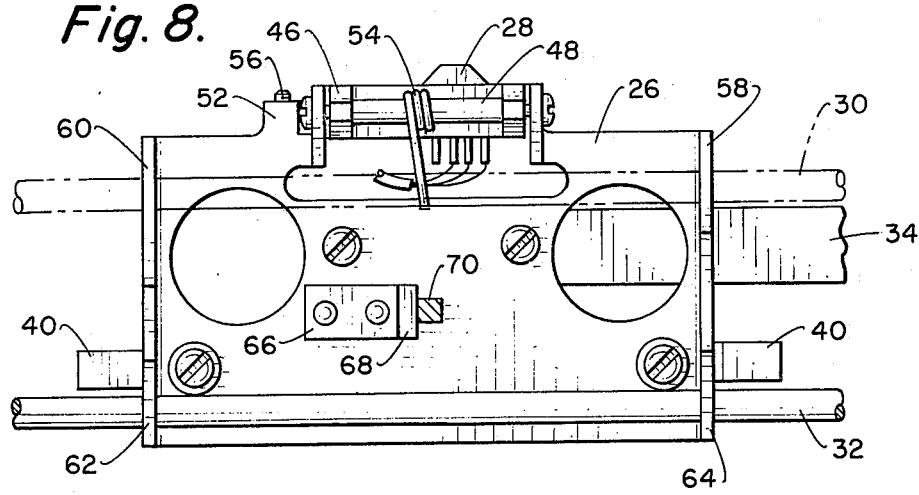
FIG. 8 is a sectional view taken along line 8—8 of FIG. 4.

The relationship of the read heads 28 and the carrier 26 is shown in detail in FIG. 8. The carrier 26 is supported on rails 30 and 32 by holes in upper flanges 58 and 60 and by slots in lower flanges 62 and 64 which ride on lower rail 32 as can best be seen in FIG. 3. An angle bracket 66 attached to the carrier 26 provides a catch 68 for moving the carrier.

Figure 9:
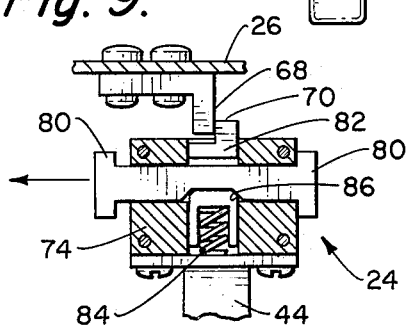
FIG. 9 is a detailed sectional view taken along line 9—9 of FIG. 3.
Figure 10:
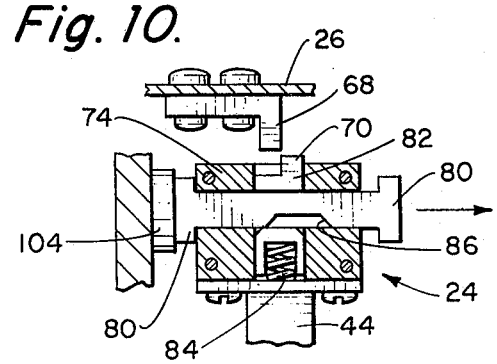
FIG. 10 is a sectional view illustrating the operation of the parts shown in FIG. 9.

The sliding ratchet tripping assembly or latch mechanism is provided to move the carrier to the start position for reading a card. For this purpose a latch is provided by a tooth 70 on the latch mechanism 24 engaging the catch 68 attached to the carrier 26. The latch mechanism 24 rides on guide rails 76 and 78 (FIG. 3) generally parallel to the carrier 26. That is, the upper body 72 of the latch mechanism has a hole through which guide rod 78 passes and the lower body 74 has a flange with a notch riding on guide rail 76. FIGS. 9 and 10 show in detail the mechanism for tripping the latch mechanism 24.

The tripping mechanism shown in FIG. 9 is comprised of a slide bar 82 biased by spring 84 which carries the latch tooth 70. The slide bar 82 is operated by tripping bar 80 notched to provide cam surfaces 86 for retracting the slide bar 82 to disengage the latch. The manner in which the tripping bar 80 operates to retract the slide bar 82 is shown in FIG. 10. The tripping bar 80 has been moved to the left and cam surface 86 has forced slide bar 82 back against the spring 84, thus disengaging the latch comprised of tooth 70 and catch 68 attached to the carrier 26. The latch mechanism 24 is moved along the rails 76, 78 by handle 20 attached to lever 44 extending outward through a slot 88 in the housing or frame 10.

Figure 4:
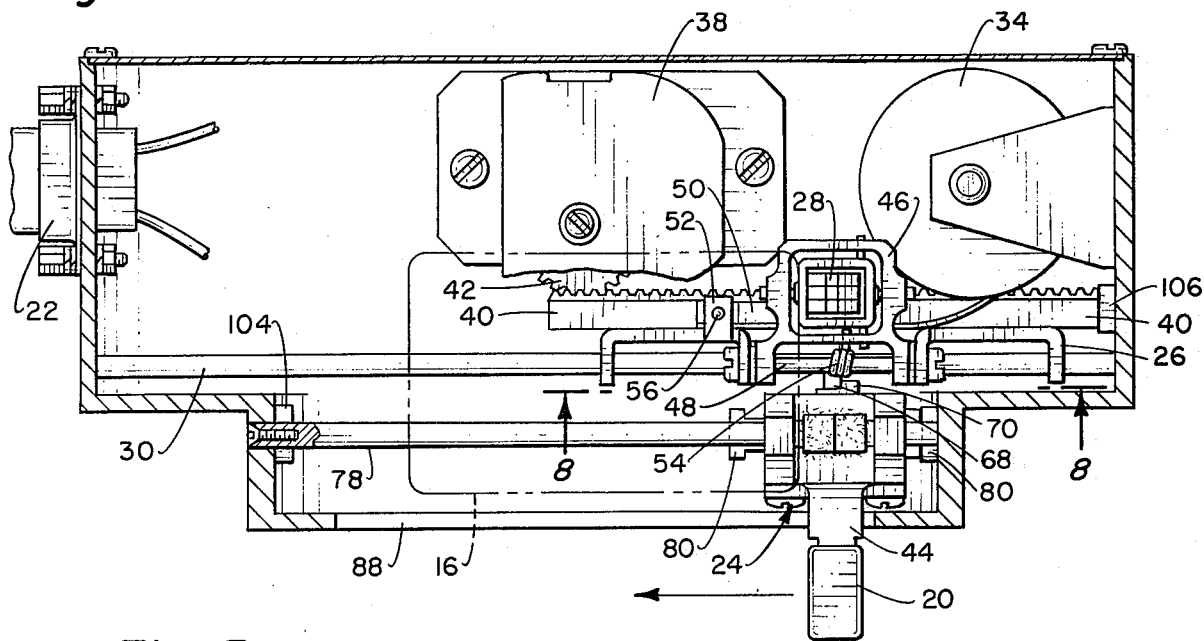
FIG. 4 is a sectional view of the card reader assembly taken at line 4—4 of FIG. 3.

The view in FIG. 9 shows the latch mechanism 24 in the position of FIG. 4, with the ratchet tooth 70 engaging the catch 68 on the carrier 26. When the latch mechanism 24 is moved by handle 20 to the opposite end of the rails 76, 78, the tripping bar 80 butts against the end wall, or a stop 104, driving it to the left, as illustrated by the arrow, until it reaches the position shown in FIG. 10 with the tooth 70 completely disengaged from the catch 68. When the latch mechanism 24 is returned to the opposite end of rails 76, 78, the other end of the tripping bar 80 strikes a stop, or the end wall, moving it to the right, as shown by the arrow, back to the position shown in FIG. 9 with the tooth 70 engaging the catch 68.

To read a credit card, the card is inserted into the slot 14 until it reaches stop tabs 92 on stopping plate 94 with the magnetic strips 90 facing toward the read heads 28. The ends 96 of the stop plate 94 may be slotted to provide a slight adjustment of the card slot, if desired. Attached to the stop bar 94 is a contact switch 98 having an activating arm 100 extending slightly beyond the plane of the stop tabs 92, so that the edge 102 of the card 16 may activate it. The activating switch 98 is wired along with the magnetic read heads 28 to the connector 22 to activate a suitable data processing system. Spring tabs 18 lock the card 16 into place for readout.

Figure 5:
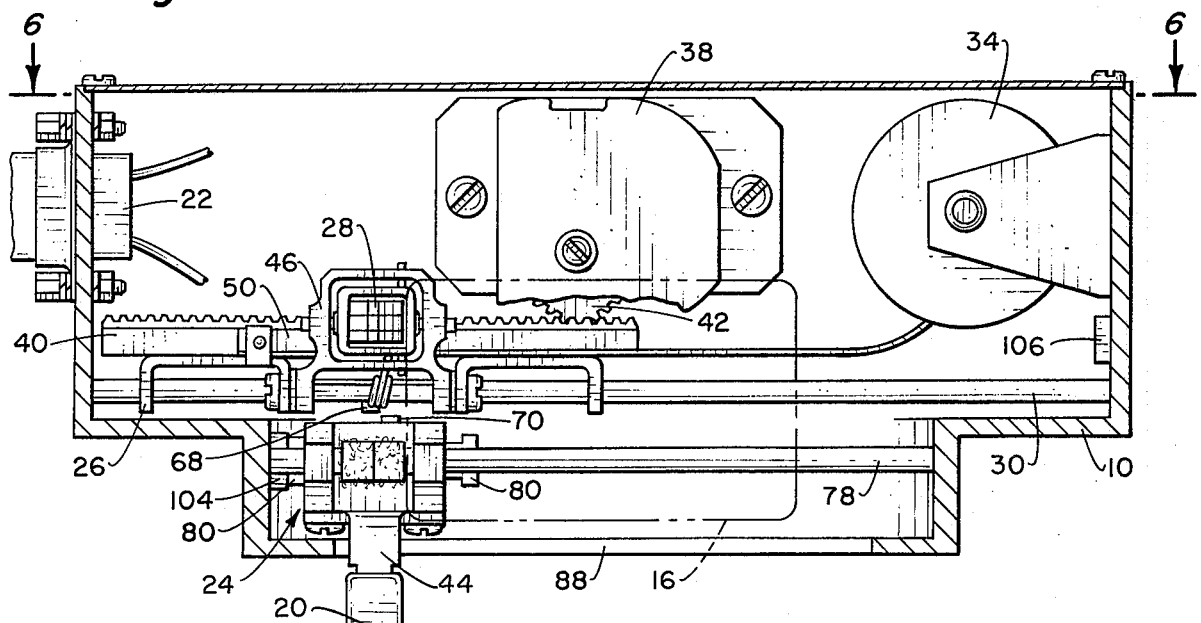
FIG. 5 is a sectional view of the card reader assembly taken along line 4—4 of FIG. 3, illustrating its operation.

With the latch mechanism 24 in the position as shown in FIG. 4, the operator moves the handle 20 to the left, as illustrated by the arrow, as far as it will slide on rails 76, 78. At this time tripping bar 80 of latch mechanism 24 will contact a stop 104 which will disengage the ratchet tooth 70 from the catch 68 attached to the carrier 26. FIG. 5 illustrates the position of the carrier 26 and the latch mechanism 24 just after the tooth 70 has been disengaged from the catch 68. At this time the spiral, constant-force spring 34 is fully extended, and the magnetic heads 28 are in the start-read position. When the tooth 70 is released from the catch 68, the constant-force spring 334 retracts the carrier toward the right, causing the magnetic read heads 28 to read the material recorded on the card 16. During the retraction of the constant-force spring 34, the speed governor 38, through gear 42, maintains the speed of the carrier 26 constant.

Figure 7:
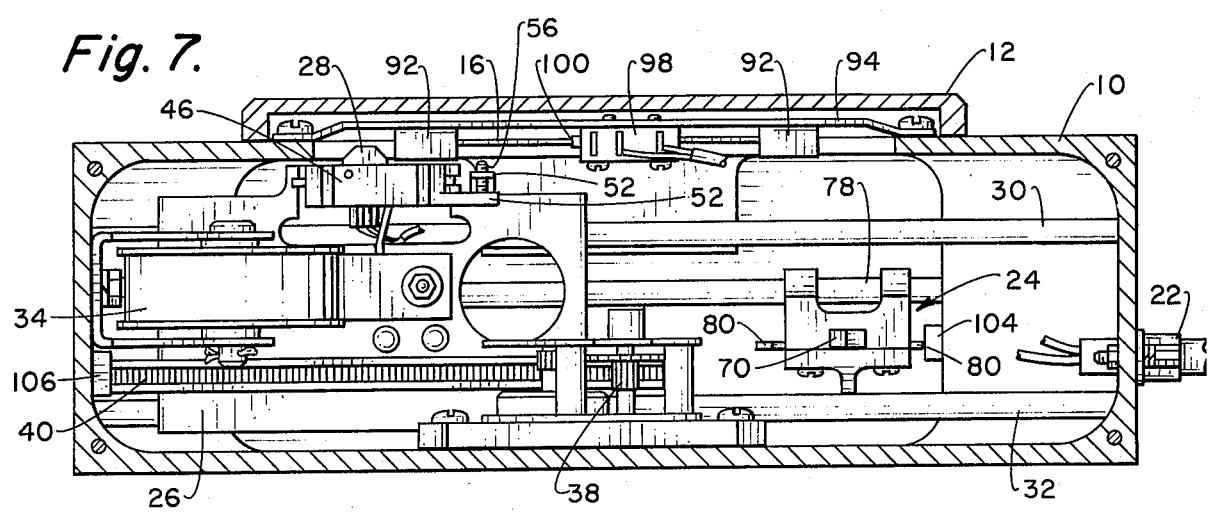
FIG. 7 is a sectional view similar to FIG. 6, illustrating the operation of the card reader assembly.

The travel of the carrier 26 is stopped just after it passes beyond the card 16 by a resilient bumper 106 on the housing which engages the end of the rack 40. The position of the latch mechanism 24 and carrier 26 after a card has been read is illustrated in FIG. 7. Here the carrier has stopped and the latch mechanism 24 is in position for recycling. This is done by moving the latch mechanism 24 from the position in the FIG. 7 back to the start cycle position shown in FIG. 4. When the latch mechanism 24 reaches the start cycle position, the tripping bar 80 engages a stop, or the wall, releasing slide bar 82 so that the tooth again may engage the catch 68. Obviously, the tooth 70 does not extend until it is past the catch 68.

Stop 104 at the trip or release end of the cycle and stop (not shown) at the opposite end of guide rail 76, 78 may be adjustable set screws, if desired, since the travel of the carrier is not critical. The only requirement is that the read head pass beyond the end of the car in its travel from the start-read position to the stop position. The cycle of the machine is then from a start position for the latch mechanism 24 to a tripped or released position and manually returned to the start position; while the cycle for the carrier 26 and the magnetic read heads 28 is from a stop position to a start-read position then return or retraction by the spiral, constant-speed spring 34 to the stop position, which is controlled by the speed governor 38, having its gear 42 engage the rack 40.

The card read described herein, as can readily be seen, is uncomplicated and easy to operate. Of course, the materials for the card reader apparatus should be non-magnetic to avoid the injection of spurious signals into the decoder system. The housing is preferably constructed of aluminum with the carrier 26 gimbal frame 46 and ratchet assembly all constructed of a nonmagnetic material, such as beryllium copper. Obviously, many other modifications and variations of the present invention are possible in the light of the above teachings. It is therefore to be understood that within the scope of the intended claims, the invention may be practiced otherwise than as specifically described.

What is claimed is:

1. Apparatus for reading out data signal recorded on a substantially flat card comprising:
    frame means for holding a card during readout,
    said frame means including elongate rail means paralleling the plane of the card,
    carrier means reciprocable on said rail means,
    readout head means mounted on said carrier means and having a face adapted to bear against a card to detect signals recorded on the card,
    motive means for moving said carrier means toward one end of said rail means,
    abutment means at said one end of said rail means, manually operable latch mechanism for moving said carrier means toward the opposite end of said rail means, latch means for effecting engagement between said latch mechanism and said carrier means when said latch mechanism is manually moved to said one end of said rail means, and for effecting disengagement when said latch mechanism has moved said carrier means to said opposite end of said rail means, said disengagement enabling said motive means to return said carrier to said abutment means.

2. Apparatus in accordance with claim 1 and including:

circuit means for electrically connecting said head means to a data processing system, switch means for providing an activation signal to the data processing system, means for maintaining said switch means in closed condition during at least a portion of the movement of said carrier means toward said one end of said rail means.

3. Apparatus in accordance with claim 1 wherein said motive means comprises:

a constant-force, spiral spring mounted on said frame means having its free end connected to said carrier means, a speed governor connected to said carrier means.

4. Apparatus in accordance with claim 1 wherein: said latch means comprises a tripping means having a latch member movable into the path of movement of said carrier means, upon engagement of said mechanism with said abutment means, a second abutment means at said opposite end of said rail means engageable by said tripping means for moving said latch member out of said path of movement.

5. Apparatus in accordance with claim 1 wherein said carrier means includes, frame means for gimbal mounting said head, and means for adjusting said frame, whereby the plane of the readout head may be adjusted.

6. Apparatus in accordance with claim 5 wherein said frame adjusting means comprises, means for pivotally mounting said frame, adjustable stop means for limiting the pivotal movement of said frame, and spring means biasing said frame against said adjustable stop means.

7. Apparatus in accordance with claim 2 wherein said switch is mounted on said frame and is activated by insertion of said card.

8. Apparatus according to claim 4 wherein said latch mechanism is mounted for movement on elongate rail means parallel to the movement of said carrier.

* * * * *